United States Patent
Goodwill (10) Patent No.: US 9,746,698 B2
(45) Date of Patent: Aug. 29, 2017

(54) ELECTRICAL CROSSTALK REDUCTION IN A HIGH-ORDER DIGITAL OPTICAL MODULATOR

(71) Applicant: Huawei Technologies Co., Ltd., Shenzhen (CN)

(72) Inventor: Dominic John Goodwill, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/832,840

(22) Filed: Aug. 21, 2015

(65) Prior Publication Data
US 2017/0052394 A1    Feb. 23, 2017

(51) Int. Cl.
| | |
|---|---|
| H04B 10/556 | (2013.01) |
| G02F 1/01 | (2006.01) |
| H04Q 11/00 | (2006.01) |
| G02F 1/225 | (2006.01) |
| H04B 10/516 | (2013.01) |

(52) U.S. Cl.
CPC .............. *G02F 1/011* (2013.01); *G02F 1/225* (2013.01); *H04B 10/516* (2013.01); *H04B 10/5561* (2013.01); *H04Q 11/0005* (2013.01); *H04Q 2011/0049* (2013.01)

(58) Field of Classification Search
CPC .................................... H04B 10/516–10/5563
See application file for complete search history.

(56) References Cited

U.S. PATENT DOCUMENTS

| | | | |
|---|---|---|---|
| 2007/0212076 A1* | 9/2007 | Roberts | ................. G02F 1/0121 398/183 |
| 2008/0089634 A1 | 4/2008 | Mosinskis et al. | |
| 2008/0095486 A1 | 4/2008 | Shastri et al. | |

(Continued)

FOREIGN PATENT DOCUMENTS

| | | |
|---|---|---|
| CN | 101529314 A | 9/2009 |
| CN | 101578544 A | 11/2009 |

(Continued)

OTHER PUBLICATIONS

Ehrlichman, "A Method for Generating Arbitrary Optical Signal Constellations Using Direct Digital Drive," Journal of Lightwave Technology, vol. 29, No. 17, Sep. 1, 2011, pp. 2545-2551.

(Continued)

*Primary Examiner* — Nathan Curs
(74) *Attorney, Agent, or Firm* — Conley Rose, P.C.

(57) ABSTRACT

A digital optical modulator including a waveguide comprising a plurality of light paths, and a plurality of phase shifter segments, each optically coupled to a light path from the plurality of light paths, configured to modulate light carried in the plurality of light paths to generate a modulated light in response to an electrical drive signal, at least two of the plurality of phase shifter segments having the same length. A digital optical modulator comprising a first waveguide arm comprising a first end and a second end, a first plurality of phase shifter segments with at least two of the first plurality of phase shifter segments that are the same length optically coupled to the waveguide arm, and a second waveguide arm optically coupled to the first waveguide arm at the first end and the second end.

21 Claims, 5 Drawing Sheets

(56) References Cited

U.S. PATENT DOCUMENTS

| | | | | |
|---|---|---|---|---|
| 2011/0044573 | A1* | 2/2011 | Webster | G02F 1/0121 385/3 |
| 2012/0251032 | A1 | 10/2012 | Kato | |
| 2015/0110500 | A1 | 4/2015 | Noguchi | |
| 2016/0139485 | A1* | 5/2016 | Winzer | G02F 1/2255 385/3 |

FOREIGN PATENT DOCUMENTS

| | | |
|---|---|---|
| CN | 102648434 A | 2/2012 |
| CN | 102472868 A | 5/2012 |
| CN | 104246583 A | 12/2014 |

OTHER PUBLICATIONS

Bhoja, "Study of PAM Modulation for 100GE Over a Single Laser," IEEE Next Gen 100G Optical Ethernet Study Group, Newport Beach, Jan. 23-27, 2012, 31 pages.

Bliss, "Channel Characterization for Evaluating Advanced Modulation Systems," IEEE 802.3bs Task Force Workshop, San Diego, California Jul. 15, 2014, 25 pages.

Cole, et al., "Higher-Order Modulation for Client Optics," New Paradigms in Optical Communications and Networks, IEEE Communications Magazine, Mar. 2013, pp. 50-57.

Lu, et al., "Optical 64QAM Transmitter Using Tandem IQ Modulators with Balanced Complexity in Electronics and Optics," OM3C.2.pdf, OFC/NFOEC Technical Digest, Optical Society of America, 2013, 3 pages.

Bergey, et al., "PAM8 Baseline Proposal," IEEE P802.3bm 40 Gb/s and 100 Gb/s Fiber Optic Task Force, Jan. 2013, 20 pages.

Ehrlichman, et al., "Improved Digital-to-Analog Conversion Using Multi-Electrode Mach-Zehnder Interferomer," Journal of Lightwave Technology, vol. 26, No. 21, Nov. 1, 2008, pp. 3567-3575.

Office Action dated Dec. 16, 2016, 23 pages, U.S. Appl. No. 14/832,902, filed Aug. 21, 2015.

Foreign Communication From A Counterpart Application, PCT Application No. PCT/CN2016/092734, International Search Report dated Nov. 3, 2016, 8 pages.

Foreign Communication From A Counterpart Application, PCT Application No. PCT/CN2016/092734, Written Opinion dated Nov. 3, 2016, 4 pages.

Foreign Communication From A Counterpart Application, PCT Application No. PCT/CN2016/092735, International Search Report dated Oct. 25, 2016, 5 pages.

* cited by examiner

ELECTRICAL CROSSTALK REDUCTION IN A HIGH-ORDER DIGITAL OPTICAL MODULATOR

BACKGROUND

Optical systems comprising high-bandwidth optical interconnects employ optical links to carry high-order waveforms from a transmitter to a receiver using optical fiber. Examples of optical systems that comprise high-bandwidth optical interconnects may include, but are not limited to, data centers, computer clusters, optical backplanes, metro dense wavelength-division multiplexing (DWDM), long-haul DWDM, passive optical networks (PONs), metro optical transport networks, long-haul optical transports, computer interconnects, and backhauls for wireless systems. Transmitters comprise a digitally-driven optical modulator that is configured to convert a multi-bit direct digital drive to an optical waveform. Examples of optical modulators include, but are not limited to, a multi-segment Mach-Zehnder interferometer modulator and a multi-segment electro-absorption modulator. An optical modulator comprises a plurality of phase shifter segments and is configured such that each phase shifter segment is driven with a digital bit stream to generate a desired optical waveform.

Existing optical modulators use a power-of-two length reduction relationship between the phase shifter segments where each subsequent phase shifter segment is half the length of the previous phase shifter segment from the most significant bit (MSB) to the least significant bit (LSB). For example, the MSB phase shifter segment is 128 times longer than the LSB phase shifter segment in an eight-bit optical amplitude modulator. The LSB is the bit position in a binary number with the lowest value. The MSB is the bit position in a binary number with the greatest value. Existing optical modulators are focused on the linearity of digital-to-analog conversions and the optimization of the driving voltage. These optical modulators apply the same driving voltage to all of the phase shifter segments.

Because the phase shifter segments are electrically driven, electrical crosstalk occurs between the phase shifters segments. Electrical crosstalk is the voltage induced on a victim phase shifter segment due to a change of voltage on an aggressor phase shifter segment. The electrical crosstalk acts on the victim phase shifter segment to produce a parasitic optical phase change. The length of the victim phase shifter segment determines the size of the parasitic optical phase change. In essence, the length of the victim phase shifter segment amplifies the electrical crosstalk from the aggressor phase shifter segment. As a result, the worst case is the electrical crosstalk from the LSB phase shifter segment to the MSB phase shifter segment, because the MSB phase shifter segment is very long. Electrical crosstalk reduces the number of bits that can be resolved, known as the effective number of bits (ENOB). As the baud rate of higher-order modulation increases, less significant bits are swamped by electrical crosstalk and the penalty due to electrical crosstalk in the transmitter becomes more important. It is desirable for a modulator to support high-order modulation while reducing the effects of electrical crosstalk.

SUMMARY

In one embodiment, the disclosure includes a digital optical modulator comprising a waveguide comprising a plurality of light paths, and a plurality of phase shifter segments, each optically coupled to a light path from the plurality of light paths, configured to modulate light carried in the plurality of light paths to generate a modulated light in response to an electrical drive signal, at least two of the plurality of phase shifter segments having the same length.

In another embodiment, the disclosure includes a digital optical modulator comprising a first waveguide arm comprising a first end and a second end, a first plurality of phase shifter segments with at least two of the first plurality of phase shifter segments that are the same length optically coupled to the waveguide arm, and a second waveguide arm optically coupled to the first waveguide arm at the first end and the second end.

In yet another embodiment, the disclosure includes a digital optical modulator comprising a first waveguide arm configured to receive a light at a first end and to output a modulated light at a second end, and a first plurality of phase shifter segments, with at least two of the first plurality of phase shifter segments that are the same length, optically coupled to the first waveguide arm and configured to modulate the light to generate the modulated light in response to a digital electrical drive signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for an optical modulator and for optical modulation. In an embodiment, an optical modulator is configured to reduce the drive voltage that is applied to LSB phase shifter segments and to increase the length of the LSB phase shifter segments. For example, an LSB phase shifter segment may be configured with a length that is 20 times longer than in existing optical modulators. Further, the LSB phase shifter segment may be configured to use $\frac{1}{20}^{th}$ of the drive voltage that is applied to the MSB phase shifter segment. Reducing the drive voltage that is applied to the LSB phase shifter segments and increasing the length of the LSB phase shifter segments reduces the amount of electrical crosstalk that is experienced by MSB phase shifter segments. In particular, the electrical crosstalk from the LSB phase shifter segments to the MSB phase shifter segments is reduced. The LSB phase shifter segments have a short length and do not make up a significant contribution to the overall length of an optical modulator. Increasing the length of the LSB phase shifter segments incurs a minimal increase in the overall optical modulator size.

Figure 1:
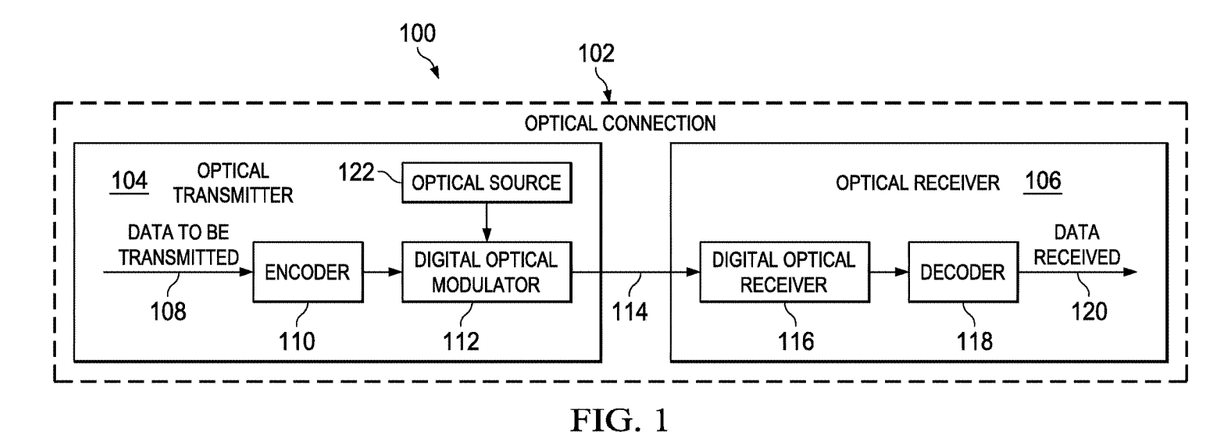
FIG. 1 is a schematic diagram of an embodiment of an optical interconnect.

FIG. 1 is a schematic diagram of an embodiment of an optical interconnect 100. Optical interconnect 100 comprises an optical connection 102 between an optical transmitter 104 and an optical receiver 106 using optical fibers 114. Optical interconnect 100 is configured to transmit data from optical transmitter 104 to optical receiver 106. Optical interconnect 100 may be configured as shown or in any other suitable configuration as would be appreciated by one of ordinary skill in the art upon viewing this disclosure.

Optical transmitter 104 is configured to obtain data 108, to encode the data 108 using digital electrical drive signals, and to send a modulated light in accordance with the encoded data. The modulated light may carry digital information or digital data. Optical transmitter 104 comprises an encoder 110 that is electrically coupled to a digital optical modulator 112 and an optical source 122 that is optically coupled to the digital optical modulator 112. Encoder 110 is configured to obtain the data 108, to encode the data 108, and to output encoded data to digital optical modulator 112 using digital electrical drive signals. Encoder 110 may also be referred to as an electrical driver. Optical source 122 is configured to provide light to the digital optical modulator 112. An example of an optical source 122 includes, but is not limited to, a laser. Digital optical modulator 112 is configured to receive the digital electrical drive signals, to modulate a light in accordance with the digital electrical drive signals, and to output the modulated light to digital optical receiver 116. Digital optical modulator 112 is a digitally driven high-order optical modulator that outputs a digitally modulated light. Examples of a digital optical modulator 112 may include, but are not limited to, a multi-segment Mach-Zehnder interferometer modulator and a multi-segment electro-absorption modulator. Digital optical modulator 112 is configured to implement any suitable modulation scheme as would be appreciated by one of ordinary skill in the art upon viewing this disclosure. For example, digital optical modulator 112 is configured to implement modulation schemes including, but not limited to, quadrature amplitude modulation (QAM), 16-QAM, 32-QAM, 64-QAM, 128-QAM, offset quadrature phase-shift keying (OQPSK), discrete multi-tone (DMT), orthogonal frequency-division multiplexing (OFDM), pulse-amplitude modulation (PAM), PAM-4, PAM-8, and PAM-16 Further, modulation schemes may include, but are not limited to, non-coherent modulation schemes, coherent modulation schemes, and modulation schemes that incorporate polarization encoding. Optical fibers 114 are configured to transmit the modulated light from the digital optical transmitter 104 to the digital optical receiver 106. The light is a high-order digital modulated light.

Optical receiver 106 is configured to receive the modulated light, to decode the modulated light, and to obtain the data from the decoded modulated light. Optical receiver 106 comprises a digital optical receiver 116 that is electrically coupled to a decoder 118. Digital optical receiver 116 is configured to receive the modulated light, to demodulate the light, and to output an electrical signal in accordance with the demodulated light. Decoder 118 is configured to receive the electrical signal, to decode the electrical signal, and to output decoded data 120.

Figure 2:
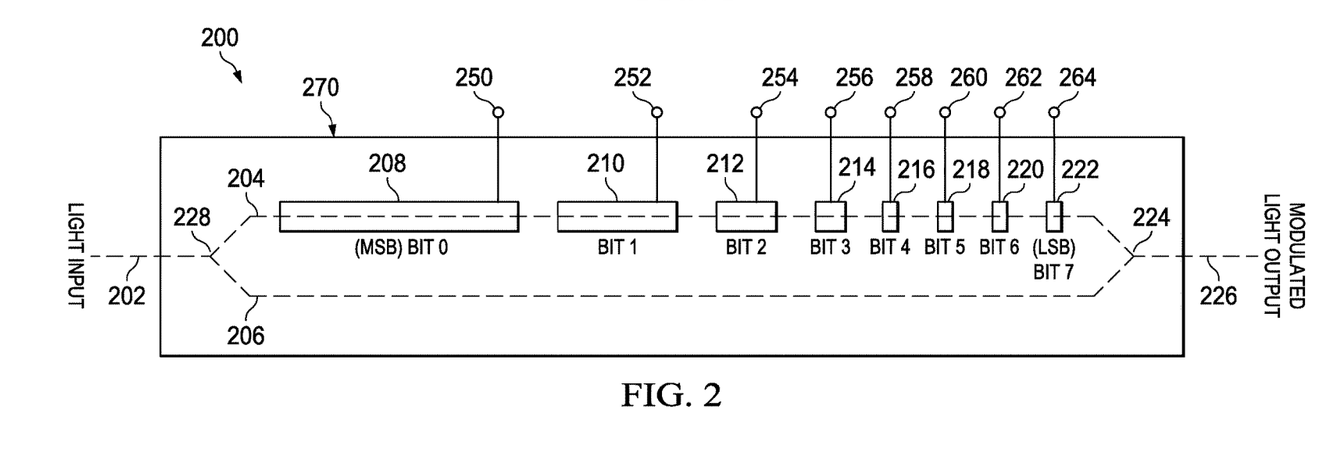
FIG. 2 is a schematic diagram of an embodiment of a digital optical modulator.

FIG. 2 is a schematic diagram of an embodiment of a digital optical modulator 200, which has the form of a Mach-Zehnder interferometric modulator. Digital optical modulator 200 may be configured similarly to digital optical modulator 112 in FIG. 1. Digital optical modulator 200 is an eight-bit digital optical amplitude modulator, which may produce an amplitude modulated waveform such as a PAM-encoded waveform. Digital optical modulator 200 is configured to receive light and digital electrical drive signals, to modulate the light in accordance with the digital electrical drive signals, and to output an optical signal as a modulated light. Digital optical modulator 200 comprises a substrate (e.g., a silicon substrate) 270 that comprises phase shifter segments 208-222, input waveguide 202, first waveguide arm 204, second waveguide arm 206, and output waveguide 226. Digital optical modulator 200 may be configured as shown or may be configured in any other suitable manner. For example, digital optical modulator 200 may comprise any suitable number of phase shifter segments.

Input waveguide 202 is optically coupled, for example, via an optical splitter (not shown), to first waveguide arm 204 and second waveguide arm 206 at a first end 228 of the first waveguide arm 204 and the second waveguide arm 206. In an embodiment, the first waveguide arm 204 and the second waveguide arm 206 are substantially parallel with each other. Input waveguide 202 is configured to guide light (e.g., continuous wave light) from a light source to the first waveguide arm 204 and the second waveguide arm 206. The light source may be configured similar to optical source 122 in FIG. 1. For example, the light source may be a laser. Output waveguide 226 is optically coupled, for example, via an optical combiner (not shown), to first waveguide arm 204 and second waveguide arm 206 at a second end 224 of the first waveguide arm 204 and the second waveguide arm 206. Output waveguide 226 is configured to guide and output modulated light, for example, to an optical fiber.

First waveguide arm 204 is referred to as a driving arm and comprises phase shifter segments 208-222. Second waveguide arm 206 is referred to as an idle arm and does not comprise phase shifter segments. Phase shifter segments 208-222 are electro-optically coupled to the first waveguide arm 204. Phase shifter segments 208-222 are configured to receive digital electrical drive signals at electrodes (e.g., electrical contacts) 250-264 from an electrical driver, for example, from an encoder, and to modulate light in accordance with the digital electrical drive signals. For example, phase shifter segments 208-222 are configured to change a refractive index of a portion of the first waveguide arm 204 in response to the digital electrical drive signal. Changing the refractive index of the first waveguide arm 204 changes the phase of the optical power of light being communicated within the first waveguide arm 204, which by means of the optical combiner may cause a change in the optical power or optical phase of the modulated light output in the output waveguide 226.

Phase shifter segment 208 is the MSB phase shifter segment and phase shifter segment 222 is the LSB phase shifter segment. One or more subsequent phase shifter segments from the MSB phase shifter segment may be referred to as MSB phase shifter segments. Similarly, one or more subsequent phase shifter segments from the LSB phase shifter segment may be referred to as LSB phase shifter segments. Phase shifter segments 208-222 are configured such that MSB phase shifter segments use a power-of-two length reduction relationship where each subsequent phase shifter segment is half the length of the previous phase shifter segment and the LSB phase shifter segments do not follow a power-of-two length reduction relationship. Two or more of the LSB phase shifter segments are the same length. If a represents a bit location that corresponds with a phase shifter segment, then the MSB may be identified as a=0 and the LSB may be identified as a=7 for an 8-bit modulator.

The phase shifter segments 208-222 may be configured with any suitable lengths. As an example, phase shifter segments 208-222 are configured such that phase shifter segments for bits a=0-3 have a length of $$L_a = \left(\frac{1}{2}\right)^a L_0,$$

and phase shifter segments for bits a=4-7 have a length of $$L_a = \left(\frac{1}{2}\right)^4 L_0,$$

where $L_0$ is the length of the MSB phase-shifter. $L_0$ is determined by the desired amplitude of the electrical drive signals and the strength of the electrical-to-optical effects in the phase-shifter which depends on the physical parameters of the phase shifter segment. Typical values of $L_0$ are in the range of 100 micrometers (μm) to 5 millimeters (mm). As such, the phase shifter segment for bit 0 has a length of $L_0$, the phase shifter segment for bit 1 has a length of $$\frac{1}{2}L_0,$$

the phase shifter segment for bit 2 has a length of $$\frac{1}{4}L_0,$$

the phase shifter segment for bit 3 has a length of $$\frac{1}{8}L_0,$$

and the phase shifter segments for bits 4-7 have a length of $$\frac{1}{16}L_0.$$

Further, phase shifter segments 208-222 are configured such that MSB phase shifter segments receive the same digital electrical drive voltage and LSB phase shifter segments do not receive the same digital electrical drive voltage. In an embodiment, LSB phase shifter segments receive a power-of-two digital electrical drive source voltage reduction relationship where each subsequent phase shifter segment receives half the digital electrical drive voltage of the previous phase shifter segment. For example, phase shifter segments 208-222 are configured such that the phase shifter segments for bits a=0-3 receive a digital electrical drive voltage of $V_o$ volts and the phase shifter segments for bits a=4-7 receive a digital electrical drive voltage of $$V_a = V_o\left(\frac{1}{2}\right)^{a-3}$$

volts. As such, the phase shifter segments for bits 0-3 receive a digital electrical drive voltage of $V_o$ volts, the phase shifter segment for bit 4 receives a digital electrical drive voltage of $$\frac{V_o}{2}$$

volts, the phase shifter segment for bit 5 receives a digital electrical drive voltage of $$\frac{V_o}{4}$$

volts, the phase shifter segment for bit 6 receives a digital electrical drive voltage of $$\frac{V_o}{8}$$

volts, and the phase shifter segment for bit 7 receives a digital electrical drive voltage of $$\frac{V_o}{16}$$

volts. The phase shifter segments 208-222 may be configured to receive any suitable digital electrical drive voltage. In such a configuration where two or more of the LSB phase shifter segments have the same length and where different digital electrical drive voltage levels are applied to at least some of the phase shifter segments 208-222, digital optical modulator 200 can reduce the effects of electrical crosstalk and can generate an actual phase shift difference that is close to a theoretical phase shift difference. In such a configuration where two or more of the LSB phase shifter segments have the same length and where different digital electrical drive voltage levels are applied to at least some of the phase shifter segments 208-222, digital optical modulator 200 can reduce the effects of electrical crosstalk and can generate an actual phase shift difference that is close to a theoretical phase shift difference.

A phase shift that is induced by a phase shifter segment for bit a can be expressed as:

$$\phi_a = KV_a S_a L_a,$$

where K is a phase shift segment constant which depends on physical parameters of the phase shifter segments, $V_a$ is the digital electrical drive voltage for the phase shifter segment for bit a, $S_a$ is a digital electrical drive signal on the phase shifter segment for bit a, and $L_a$ is the length of the phase shifter segment for bit a. The digital electrical drive voltage has a voltage of $V_a$ for a bit value of one and a voltage of zero for a bit value of zero. The phase shift on a phase shifter segment including electrical crosstalk from another phase shifter segment at bit b can be expressed as:

$$\varphi_a = K\left(V_a S_a L_a + \sum_{b \neq a} X_{ba} V_b S_b L_b\right),$$

and the total phase shift can be expressed as:

$$\varphi_{total} = K(\Sigma_a(V_a S_a L_a + \Sigma_{b \neq a} X_{ba} V_b S_b L_b)),$$

where $X_{ba}$ is the electrical crosstalk between the phase shifter segment at bit b and the phase shifter segment at bit a, $V_b$ is the digital electrical drive voltage for the phase shifter segment for bit b, $S_b$ is a digital electrical drive signal on the phase shifter segment of bit b, and $L_b$ is the length of the phase shifter segment for bit b.

As an example, digital optical modulator 200 transitions from a first driving pattern of 10000000 to a second driving pattern of 10000001. The theoretical phase shift difference is $$\frac{\varphi_{max}}{256}.$$

The actual phase shift difference for digital optical modulator 200 is:

$$\varphi_{max} * \left(\left(\frac{1}{16}\right)\left(\frac{1}{30}\right)\left(\frac{128}{256}\right) + \frac{1}{256}\right),$$

which can be rewritten as:

$$1.27 * \left(\frac{\varphi_{max}}{256}\right).$$

The actual phase shift difference for digital optical modulator 200 is about 1.27 times larger than the theoretical phase shift difference. The actual phase shift difference therefore is close to the theoretical phase shift difference and is close to the magnitude of the LSB. In this example, the desired number of bits of the 8-bit modulator is 8, and the effective number of bits (ENOB) is $\log_2 (2^8/1.27) = 7.6$ bits which is close to the desired number of bits. Therefore, the effects of electrical crosstalk between the MSB phase shifter segments and the LSB phase shifter segments are significantly reduced compared to existing optical modulators.

In an embodiment, each phase shifter segment 208-222 may be a traveling wave phase shifter. A traveling wave phase shifter comprises a plurality of electrodes that are arranged substantially parallel to an optical waveguide such that the digital electrical drive signal of each bit propagates along the electrodes at essentially the same velocity as a light propagating along the optical waveguide so that the digital electrical drive signal and the optical signal remain in phase and the modulation effect builds up as the light propagates through the traveling wave phase shifter.

In another embodiment, each phase shifter segment 208-222 may be a lumped-element phase shifter. A lumped-element phase shifter comprises a plurality of electrodes that are arranged substantially parallel to the optical waveguide such that each electrode comprises sub-divisions that may be equal in length and that may be short with respect to the length of the phase shifter. Each sub-division of a phase shifter segment may be configured to receive the same digital electrical drive voltage. The sub-division may be configured to be driven sequentially in time so that the digital electrical drive signal for a bit and a light propagating along the optical waveguide interact at the same phase for all sub-divisions of a phase shifter segment. Thus, the digital electrical drive signal moves along the phase shifter segment by being applied to each sub-division in sequence such that the digital electrical drive signal and the light remain in phase and the modulation effect builds up as the light propagates through the lumped-element phase shifter.

In another embodiment, phase shifter segments 208-222 may be configured as a combination of traveling wave phase shifters and lumped-element phase shifters. For example, the MSB phase shifter segments may be configured as traveling wave phase shifters and the LSB phase shifter segments may be configured as lumped-element phase shifters. Alternatively, phase shifter segments 208-222 may be configured using any other suitable type or configuration of phase shifters as would be appreciated by one of ordinary skill in the art upon viewing this disclosure.

Implementations of digital optical modulator 200 may include, but are not limited to, a Mach-Zehnder silicon optical modulator, a Mach-Zehnder modulator using materials exhibiting electro-optic pockels effect (e.g., lithium niobate), a Mach-Zehnder modulator using group III-IV semiconductors (e.g., indium phosphide and gallium arsenide), a Mach-Zehnder modulator using silicon-germanium, an electro-absorption using group III-IV semiconductors, an electro-absorption modulator using silicon-germanium, and a modulator comprising a push-pull electrode arrangement comprising two driven arms that are driven in opposite polarities.

Figure 3:
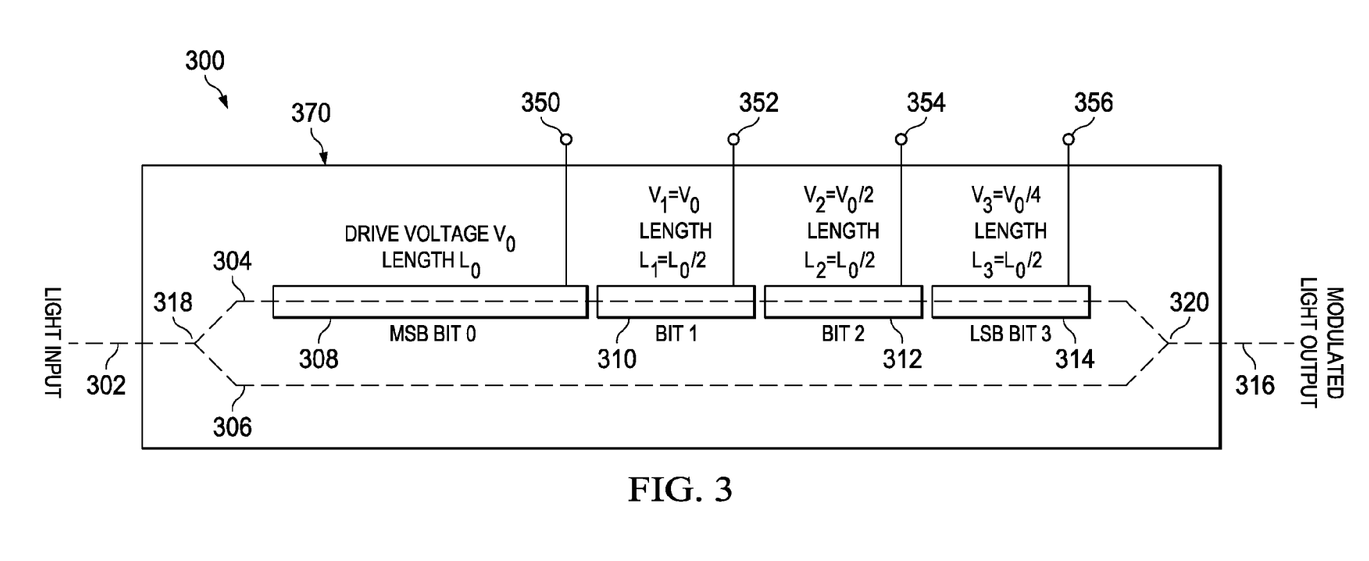
FIG. 3 is a schematic diagram of an embodiment of a digital optical modulator with a single driving arm.

FIG. 3 is a schematic diagram of an embodiment of a digital optical modulator 300 with a single driving arm. Digital optical modulator 300 may be configured similarly to digital optical modulator 112 in FIG. 1. Digital optical modulator 300 is a four-bit digital optical modulator. Digital optical modulator 300 is configured to receive light and digital electrical drive signals, to modulate the light in accordance with the digital electrical drive signals, and to output an optical signal as a modulated light. Digital optical modulator 300 comprises a substrate 370 that comprises phase shifter segments 308-314, input waveguide 302, first waveguide arm 304, second waveguide arm 306, and output waveguide 316. Digital optical modulator 300 may be configured as shown or may be configured in any other suitable manner.

Input waveguide 302 is optically coupled, for example, via an optical splitter (not shown), to first waveguide arm 304 and second waveguide arm 306 at a first end 318 of the first waveguide arm 304 and the second waveguide arm 306. In an embodiment, the first waveguide arm 304 and the second waveguide arm 306 are substantially parallel with each other. Input waveguide 302 is configured to guide light from an optical source to the first waveguide arm 304 and the second waveguide arm 306. Output waveguide 316 is optically coupled, for example, via an optical combiner (not shown), to first waveguide arm 304 and second waveguide arm 306 at a second end 320 of the first waveguide arm 304 and the second waveguide arm 306. Output waveguide 316 is configured to guide and output modulated light, for example, to an optical fiber. First waveguide arm 304 is referred to as a driving arm and second waveguide arm 306 is referred to as an idle arm.

Phase shifter segments 308-314 are electro-optically coupled to the first waveguide arm 304. Phase shifter segments 308-314 are configured to receive digital electrical drive signals at electrodes 350-356 from an electrical driver and to modulate light in accordance with the digital electrical drive signals. Phase shifter segment 308 is the MSB phase shifter segment and phase shifter segment 314 is the LSB phase shifter segment. Phase shifter segments 308-314 are configured such that two or more of the LSB phase shifter segments are the same length. Further, phase shifter segments 308-314 are configured such that different digital electrical drive voltage levels are applied to at least some of the phase shifter segments 308-314. For example, phase shifter segment 308 is configured with a length of $L_o$ and to receive a drive signal voltage of $V_o$ volts at electrode 350. Phase shifter segment 310 is configured with a length of $$\frac{L_o}{2}$$

and to receive a digital electrical drive signal voltage of $V_o$ volts at electrode 352. Phase shifter segment 312 is configured with a length of $$\frac{L_o}{2}$$

and to receive a digital electrical drive signal voltage of $$\frac{V_o}{2}$$

volts at electrode 354. Phase shifter segment 314 is configured with a length of $$\frac{L_o}{2}$$

and to receive a digital electrical drive signal voltage of $$\frac{V_o}{4}$$

volts at electrode 356. The phase shifter segments 308-314 may be configured with any suitable lengths. Further, the phase shifter segments 308-314 may be configured to receive any suitable digital electrical drive voltages. Second waveguide arm 306 does not comprise phase shifter segments and is not configured to modulate light. Second waveguide arm 306 is configured to guide light from the input waveguide 302 to the output waveguide 316.

In such a configuration where two or more of the LSB phase shifter segments are the same length and where different digital electrical drive voltage levels are applied to at least some of the phase shifter segments 308-314, digital optical modulator 300 can reduce the effects of electrical crosstalk. The actual phase shift difference of digital optical modulator 300 is close to the theoretical phase shift difference and is close to the magnitude of the LSB. The effects of electrical crosstalk between the MSB phase shifter segments and the LSB phase shifter segments are significantly reduced compared to existing optical modulators.

Implementations of digital optical modulator 300 may include, but are not limited to, a Mach-Zehnder silicon optical modulator, a Mach-Zehnder modulator using materials exhibiting electro-optic pockels effect (e.g., lithium niobate), a Mach-Zehnder modulator using group III-IV semiconductors (e.g., indium phosphide and gallium arsenide), a Mach-Zehnder modulator using silicon-germanium, an electro-absorption modulator using group III-IV semiconductors, an electro-absorption modulator using silicon-germanium, and a modulator comprising a push-pull electrode arrangement comprising two driven arms that are driven in opposite polarities.

Figure 4:
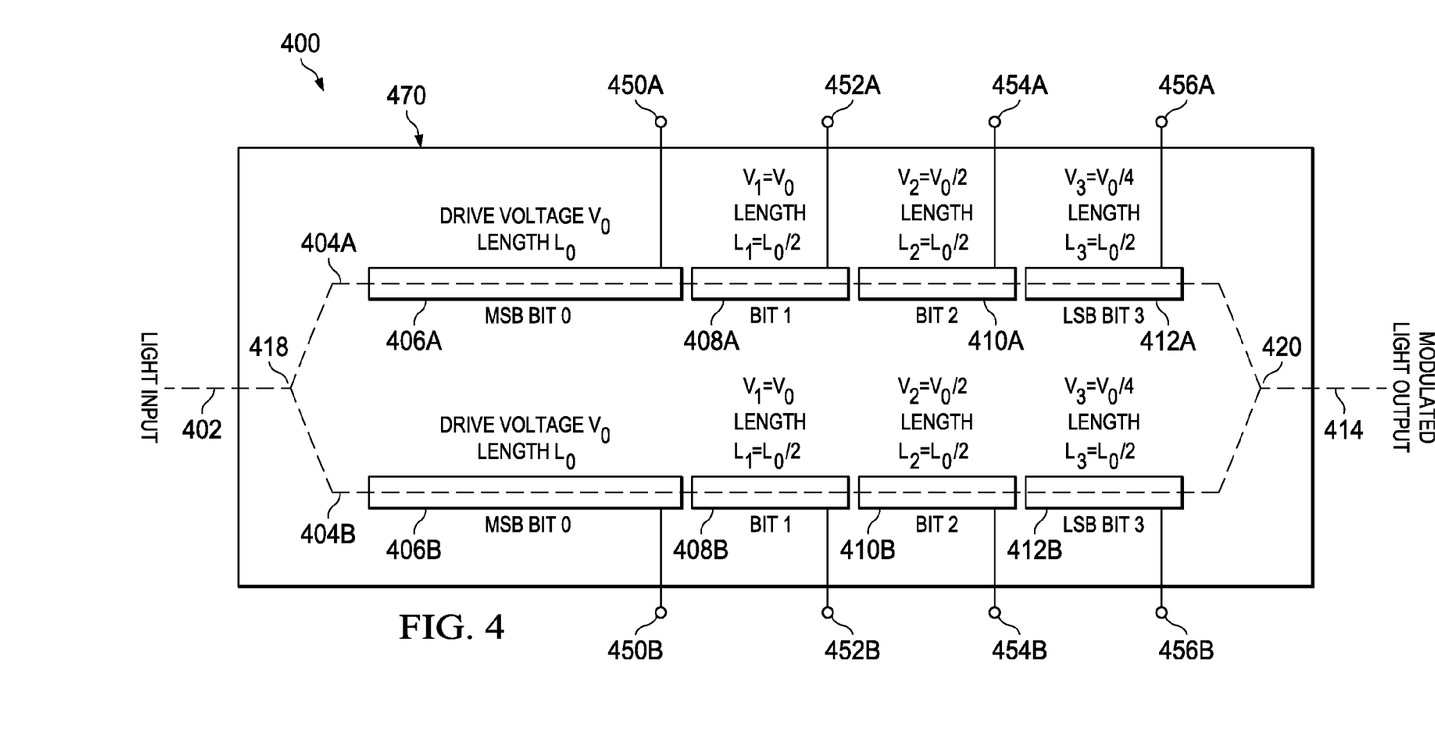
FIG. 4 is a schematic diagram of an embodiment of a digital optical modulator with dual driving arms.

FIG. 4 is a schematic diagram of another embodiment of a digital optical modulator 400 with dual driving arms. A digital optical modulator with dual driving arms may provide less optical loss than a digital modulator with a single driving arm. Digital optical modulator 400 may be configured similarly to digital optical modulator 112 in FIG. 1. Digital optical modulator 400 is a four-bit digital optical modulator. Digital optical modulator 400 is configured to receive light and digital electrical drive signals, to modulate the light in accordance with the digital electrical drive signals, and to output an optical signal as a modulated light. Digital optical modulator 400 comprises a substrate 470 that comprises an input waveguide 402, phase shifter segments 406A-412A, a first waveguide arm 404A, phase shifter segments 406B-412B, a second waveguide arm 404B, and an output waveguide 414. Digital optical modulator 400 may be configured as shown or may be configured in any other suitable manner.

Input waveguide 402 is optically coupled, for example, via an optical splitter (not shown), to first waveguide arm 404A and second waveguide arm 404B at a first end 418 of first waveguide arm 404A and second waveguide arm 404B. In an embodiment, the first waveguide arm 404A and the second waveguide arm 404B are substantially parallel with each other. Output waveguide 414 is optically coupled, for example, via an optical combiner (not shown), to first waveguide arm 404A and second waveguide arm 404B at a second end 420 of the first waveguide arm 404A and the second waveguide arm 404B. First waveguide arm 404A and second waveguide arm 404B are both configured as driving arms.

Phase shifter segments 406A-412A are electro-optically coupled to the first waveguide arm 404A. Phase shifter segments 406A-412A are configured to receive digital electrical drive signals at electrodes 450A-456A from an electrical driver and to modulate the light in accordance with the digital electrical drive signals. Phase shifter segment 406A is the MSB phase shifter segment and phase shifter segment 412A is the LSB phase shifter segment. Phase shifter segments 406A-412A are configured such that two or more of the LSB phase shifter segments are the same length. Further, phase shifter segments 406A-412A are configured such that different digital electrical drive voltage levels are applied to at least some of the phase shifter segments 406A-412A. For example, phase shifter segment 406A is configured with a length of $L_o$ and to receive a digital electrical drive signal voltage of $V_o$ volts at electrode 450A. Phase shifter segment 408A is configured with a length of $$\frac{L_o}{2}$$

and to receive a digital electrical drive signal voltage of $V_o$ volts at electrode 452A. Phase shifter segment 410A is configured with a length of $$\frac{L_o}{2}$$

and to receive a digital electrical drive signal voltage of $$\frac{V_o}{2}$$

volts at electrode 454A. Phase shifter segment 412A is configured with a length of $$\frac{L_o}{2}$$

and to receive a digital electrical drive signal voltage of $$\frac{V_o}{4}$$

volts at electrode 456A. The phase shifter segments 406A-412A may be configured with any suitable lengths. Further, the phase shifter segments 406A-412A may be configured to receive any suitable digital electrical drive voltages.

Second waveguide arm 404B is configured to mirror first waveguide arm 404A. For example, phase shifter segments 406B-412B are electro-optically coupled to the second waveguide arm 304B. Phase shifter segments 406B-412B are configured to receive digital electrical drive signals at electrodes 450B-456B from an electrical driver and to modulate the light in accordance with the digital electrical drive signals. Phase shifter segment 406B is the MSB phase shifter segment and phase shifter segment 412B is the LSB phase shifter segment. Phase shifter segments 406B-412B are configured such that two or more of the LSB phase shifter segments are the same length. Further, phase shifter segments 406B-412B are configured such that different digital electrical drive voltage levels are applied to at least some of the phase shifter segments 406B-412B. For example, phase shifter segment 406B is configured with a length of $L_o$ and to receive a digital electrical drive signal voltage of $V_o$ volts at electrode 450B. Phase shifter segment 408B is configured with a length of $$\frac{L_o}{2}$$

and to receive a digital electrical drive signal voltage of $V_o$ volts at electrode 452B. Phase shifter segment 410B is configured with a length of $$\frac{L_o}{2}$$

and to receive a digital electrical drive signal voltage of $$\frac{V_o}{2}$$

volts at electrode 454B. Phase shifter segment 412B is configured with a length of $$\frac{L_o}{2}$$

and to receive a digital electrical drive signal voltage of $$\frac{V_o}{4}$$

volts at electrode 456B. The phase shifter segments 406B-412B may be configured with any suitable lengths. Further, the phase shifter segments 406B-412B may be configured to receive any suitable digital electrical drive voltage. In an embodiment, the phase shifter segments 406B-412B may be configured to receive digital electrical drive voltages that are equal in amplitude but opposite in polarity from the digital electrical drive signals that are received at phase shifter segments 406A-412A. In another embodiment, the phase shifter segments 406B-412B may have different lengths or be driven with different driving voltages than corresponding respective phase shifter segments 406A-412A, and the digital electrical drive signals may be different between the first waveguide arm 404A and the second waveguide arm 404B, so that the effective number of bits is larger than the number of segments in one of the arms, such that a high order of analog modulation is achieved. In a further embodiment, the number of phase shifter segments in second waveguide arm 404B may be different than the number of phase shifter segments in first waveguide arm 404A.

In such a configuration where two or more of the LSB phase shifter segments on the same driving arm have the same phase shift segment length and where different digital electrical drive voltage levels are applied to at least some of the phase shifter segments 406A-412A and 406B-412B, digital optical modulator 400 can reduce the effects of electrical crosstalk. The actual phase shift difference of digital optical modulator 400 is close to the theoretical phase shift difference and is close to the magnitude of the LSB. The effects of electrical crosstalk between the MSB phase shifter segments and the LSB phase shifter segments are significantly reduced compared to existing optical modulators.

Implementations of digital optical modulator 400 may include, but are not limited to, a Mach-Zehnder silicon optical modulator, a Mach-Zehnder modulator using materials exhibiting electro-optic pockels effect (e.g., lithium niobate), a Mach-Zehnder modulator using group III-IV semiconductors (e.g., indium phosphide and gallium arsenide), a Mach-Zehnder modulator using silicon-germanium, an electro-absorption using group III-IV semiconductors, an electro-absorption modulator using silicon-germanium, and a modulator comprising a push-pull electrode arrangement comprising two driven arms that are driven in opposite polarities.

Figure 5:
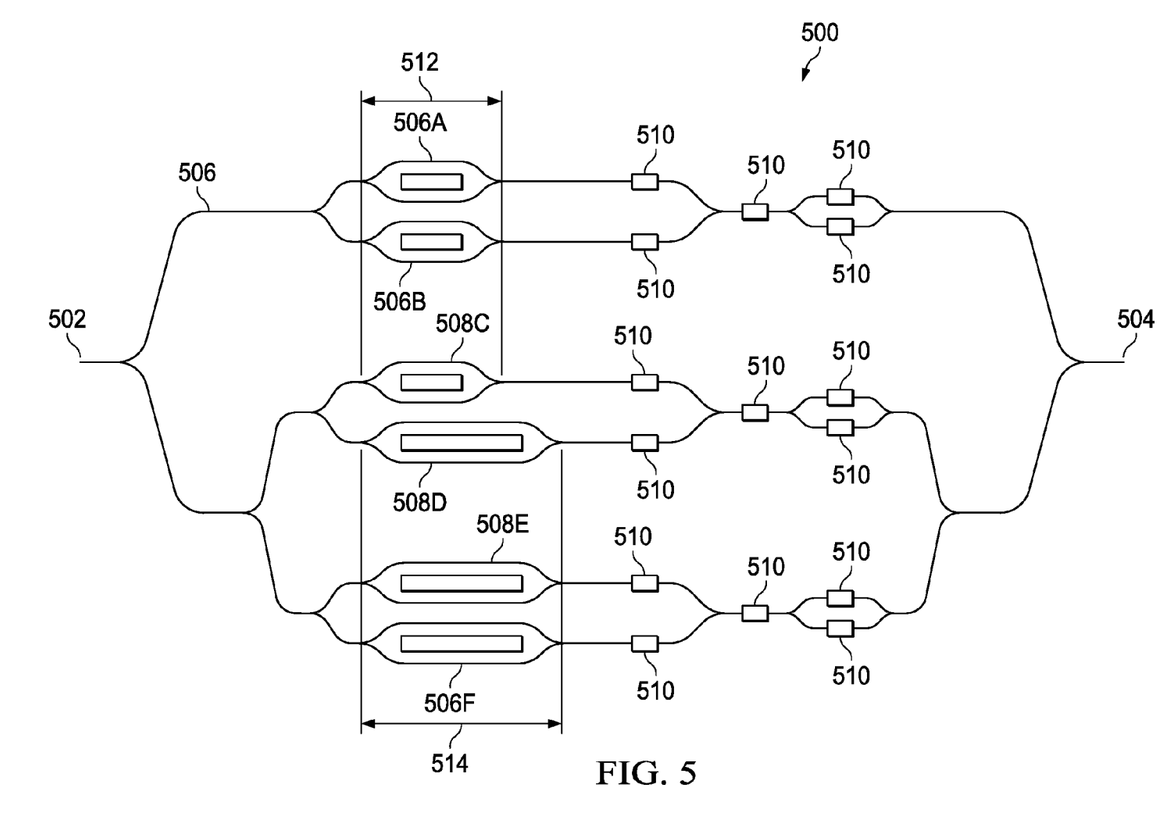
FIG. 5 is a schematic diagram of an embodiment of a 64-QAM digital optical modulator.

FIG. 5 is a schematic diagram of an embodiment of a 64-QAM digital optical modulator 500. Digital optical modulator 500 may be configured similarly to digital optical modulator 112 in FIG. 1. Digital optical modulator 500 is configured to receive light and digital electrical drive signals, to modulate the light in accordance with the digital electrical drive signals, and to output an optical signal as a modulated light in a constellation of amplitude and phase such as a 64-QAM constellation. Digital optical modulator 500 is configured to encode and output a 64-QAM signal using a 6-bit digital electrical word that is imposed onto respective six phase shifter segments.

Digital optical modulator 500 comprises waveguide 506, phase shifter segments 508A, 508B, 508C, 508D, 508E, and 508F, and static phase shifter segments 510. Digital optical modulator 500 may be configured as shown or may be configured in any other suitable manner. Waveguide 506 is configured to receive light at a first end 502 and to output a modulated light at a second end 504. Waveguide 506 comprises a plurality of light paths that are optically coupled to each other using optical combiners and optical splitters. Waveguide 506 is optically coupled to the phase shifter segments 508A-508F and static phase shifter segments 510 via the plurality of light paths. Phase shifter segments 508A-508F may be configured as high-speed modulation phase shifter segments that are each driven by a bit of a digital electrical word. The phase shifter segments 508A-508F are configured such that phase shifter segment 508A is the MSB and phase shifter segment 508F is the LSB. Digital optical modulator 500 is configured such that the length 514 of one or more of LSB phase shifter segments may be longer than the length 512 of one or more of the MSB phase shifter segments. Phase shifter segments 508A-508F may also be configured such that two or more of the LSB phase shifter segments are the same length. In an embodiment, the phase shifter segments 508A-508F are configured such that MSB phase shifter segments use a power-of-two length reduction relationship where each subsequent phase shifter segment is half the length of the previous phase shifter segment and the LSB phase shifter segments do not follow a power-of-two length reduction relationship. In an embodiment, the phase shifter segments 508A-508F are configured such that MSB phase shifter segments receive the same digital electrical drive voltage and LSB phase shifter segments do not receive the same digital electrical drive voltage. In another embodiment, the LSB phase shifter segments are configured to receive a power-of-two digital electrical drive source voltage reduction relationship where each subsequent phase shifter segment receives half the digital electrical drive voltage of the previous phase shifter segment. The LSB phase shifter segments may also be driven by a lower digital electrical drive voltage than the MSB phase shifter segments. The static phase shifter segments 510 are configured to combine the outputs of the phase shifter segments 508A-508F in a desired relative phase and amplitude combination to create various constellation patterns.

Figure 6:
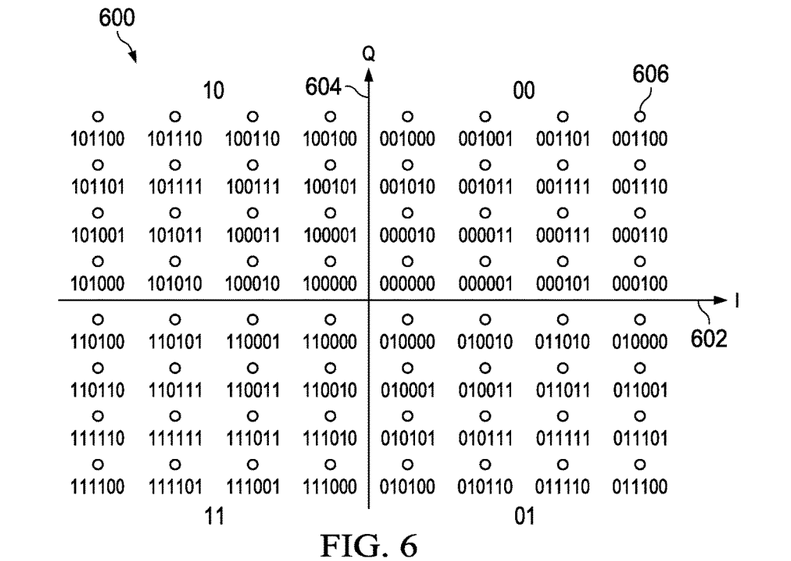
FIG. 6 is a constellation diagram of an embodiment of a 64-QAM constellation.

FIG. 6 is a constellation diagram 600 of an embodiment of a 64-QAM constellation. Constellation diagram 600 is a representation of a signal that is modulated by digital optical modulator using a digital modulation scheme such as 64-QAM. The digital optical modulator is configured similarly to digital optical modulator 200 in FIG. 2, digital optical modulator 300 in FIG. 3, digital optical modulator 400 in FIG. 4, or digital optical modulator 500 in FIG. 5. Axis 602 represents an in-phase (I) axis and axis 604 represents a quadrature (Q) axis. Constellation diagram 600 comprises 64 constellation points 606. Each constellation point 606 is associated with a 6-bit value that corresponds with a location within the constellation diagram 600.

Figure 7:
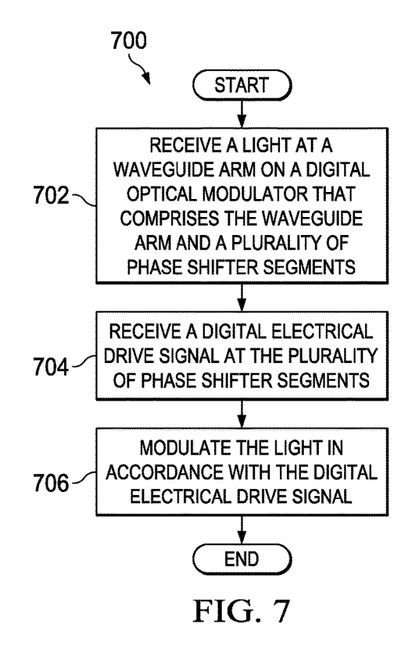
FIG. 7 is a flowchart of an embodiment of an optical modulation method for a digital optical modulator.

FIG. 7 is a flowchart of an embodiment of an optical modulation method 700 for a digital optical modulator. Method 700 is implemented in an optical interconnect (e.g., optical interconnect 100 in FIG. 1) to generate an optical signal as a modulated light. A digital optical modulator that comprises a waveguide arm and a plurality of phase shifter segments is obtained. The waveguide arm is electro-optically coupled to a plurality of phase shifter segments. In an embodiment, the digital optical modulator is configured similarly to digital optical modulator 200 in FIG. 2, digital optical modulator 300 in FIG. 3, or digital optical modulator 400 in FIG. 4. At step 702, light is received at the waveguide arm. At step 704, a digital electrical drive signal is received at the electrodes of the phase shifter segments. For example, the digital electrical drive signal is a binary word, a digital word, or bit string that is applied to the electrodes of the phase shifter segments. The digital electrical drive signal may be received by all of the electrodes of the phase shifter segments at substantially the same time. The digital electrical drive signal comprises two or more drive voltage levels. For example, a first digital electrical drive voltage level is applied to LSB phase shifter segments and a second digital electrical drive voltage is applied to MSB phase shifter segments. The first digital electrical drive voltage may be a lower voltage level than the second digital electrical drive voltage level. At step 706, the light is modulated in accordance with the digital electrical drive signal. The phase shifter segments are configured to change a refractive index of the waveguide arm in response to the digital electrical drive signal. Changing the refractive index of the waveguide arm changes the phase of the optical power of the light, and thereby generates a modulated light. The modulated light is emitted from the waveguide arm and the digital optical modulator.

Figure 8:
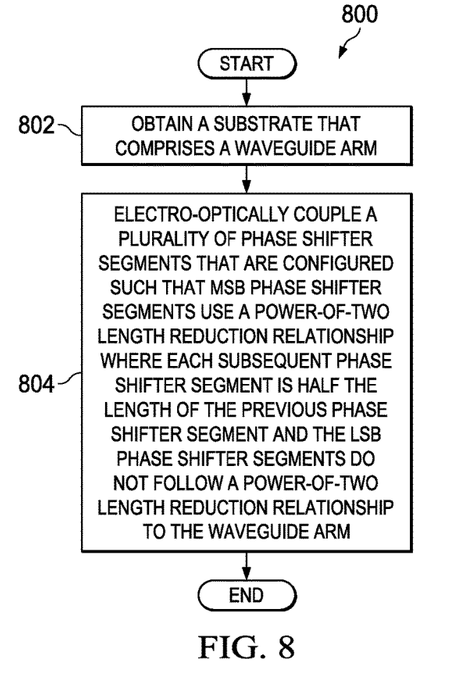
FIG. 8 is a flowchart of an embodiment of a method for manufacturing a digital optical modulator.

FIG. 8 is a flowchart of an embodiment of a method 800 for manufacturing a digital optical modulator. In an embodiment, the digital optical modulator is configured similarly to digital optical modulator 200 in FIG. 2, digital optical modulator 300 in FIG. 3, or digital optical modulator 400 in FIG. 4. At step 802, a substrate is provided that comprises a waveguide arm. At step 804, a plurality of phase shifter segments are electro-optically coupled to the waveguide arm. The phase shifter segments are configured such that MSB phase shifter segments use a power-of-two length reduction relationship where each subsequent phase shifter segment is half the length of the previous phase shifter segment and the LSB phase shifter segments do not follow a power-of-two length reduction relationship. Two or more of the LSB phase shifter segments are the same length. Further, the phase shifter segments are configured such that MSB phase shifter segments receive the same digital electrical drive voltage and LSB phase shifter segments do not receive the same digital electrical drive voltage. LSB phase shifter segments receive a power-of-two digital electrical drive source voltage reduction relationship where each subsequent phase shifter segment receives half the digital electrical drive voltage of the previous phase shifter segment. As such, a lower voltage level is applied to LSB phase shifter segments than the voltage level that is applied to the MSB phase shifter segments.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A transmitter comprising:
    an encoder configured to:
        encode data to produce encoded data; and
        output the encoded data;
    an optical source configured to provide light;
    a digital optical modulator coupled to the encoder and the optical source and comprising:
        a first waveguide arm comprising a plurality of light paths; and
        a plurality of phase shifter segments coupled to the light paths and configured to modulate the light using the encoded data to generate a modulated light, wherein the phase shifter segments comprise a first most significant bit (MSB) phase shifter segment configured to receive a first MSB digital electrical drive voltage and a first least significant bit (LSB) phase shifter segment configured to receive a first LSB digital electrical drive voltage, wherein each of the phase shifter segments corresponds with a bit of the encoded data, wherein each bit is associated with only one phase shifter segment in the first waveguide arm, and wherein lengths of the phase shifter segments are not in a binary relationship and the first LSB digital electrical drive voltage is smaller than the first MSB digital electrical drive voltage to reduce electrical crosstalk between the phase shifter segments; and
    an electrical driver coupled to the digital optical modulator and configured to provide the first MSB digital electrical drive voltage and the first LSB digital electrical drive voltage.

2. The transmitter of claim 1, wherein each of the phase shifter segments corresponds to a bit location in a digital electrical word, wherein the first MSB phase shifter segment corresponds with an MSB for the digital electrical word, and wherein the first LSB phase shifter segment corresponds with an LSB for the digital electrical word.

3. The transmitter of claim 2, wherein the first MSB phase shifter segment is longer than the first LSB phase shifter segment.

4. The transmitter of claim 1, wherein the modulated light carries digital information.

5. The transmitter of claim 1, wherein the phase shifter segments are configured to create a binary relationship of phase change.

6. The transmitter of claim 1, wherein the phase shifter segments comprise a plurality of MSB phase shifter segments and a plurality of LSB phase shifter segments, and wherein the LSB phase shifter segments are longer than a power-of-2 relationship compared to the MSB phase shifter segments.

7. A digital optical modulator comprising:
    a first waveguide arm comprising a first end and a second end;
    a first plurality of phase shifter segments coupled to the first waveguide arm and comprising a first most significant bit (MSB) phase shifter segment configured to receive a first MSB digital electrical drive voltage and a first least significant bit (LSB) Phase shifter segment configured to receive a first LSB digital electrical drive voltage, wherein each of the phase shifter segments corresponds with a bit, wherein each bit is associated with only one phase shifter segment in the first waveguide arm, and wherein lengths of the phase shifter segments are not in a binary relationship and the first LSB digital electrical drive voltage is smaller than the first MSB digital electrical drive voltage to reduce electrical crosstalk between the phase shifter segments; and
    a second waveguide arm optically coupled to the first waveguide area at the first end and the second end.

8. The digital optical modulator of claim 7, further comprising a plurality of electrical contacts coupled to the phase shifter segments, wherein at least two of the electrical contacts are configured to receive different digital electrical drive voltage levels.

9. The digital optical modulator of claim 8, wherein the different digital electrical drive voltage levels use a power-of-two voltage reduction relationship.

10. The digital optical modulator of claim 7, wherein the first plurality of phase shifter segments does not use a power-of-two length reduction relationship.

11. The digital optical modulator of claim 7, wherein a first portion of the first plurality of phase shifter segments uses a power-of-two length reduction relationship, and wherein a second portion of the first plurality of phase shifter segments does not use a power-of-two length reduction.

12. The digital optical modulator of claim 7, wherein the first waveguide arm is substantially parallel to the second waveguide arm.

13. The digital optical modulator of claim 7, further comprising a second plurality of phase shifter segments electro-optically coupled to the second waveguide arm, and wherein at least two of the second plurality of phase shifter segments are the same length.

14. The digital optical modulator of claim 7, wherein the phase shifter segments are configured to create a binary relationship of phase change.

15. A digital optical modulator comprising:
    a first waveguide arm configured to receive a light at a first end and to output a modulated light at a second end; and
    a first plurality of phase shifter segments, coupled to the first waveguide arm, comprising a first most significant bit (MSB) phase shifter segment and a first least significant bit (LSB) phase shifter segment, and configured to modulate the light based on digital electrical drive voltages to generate the modulated light,
    wherein the first MSB phase shifter segment is configured to receive a first MSB digital electrical drive voltage,
    wherein the first LSB phase shifter segment is configured to receive a first LSB digital electrical drive voltage, wherein each of the phase shifter segments corresponds with a bit, wherein each bit is associated with only one phase shifter segment in the first waveguide arm, and wherein lengths of the phase shifter segments are not in a binary relationship and the first LSB digital electrical drive voltage is smaller than the first MSB digital electrical drive voltage to reduce electrical crosstalk between the phase shifter segments.

16. The digital optical modulator of claim 15, further comprising a plurality of electrodes coupled to the first plurality of phase shifter segments, wherein two or more of the electrodes are configured to receive different digital electrical drive voltage levels.

17. The digital optical modulator of claim 15, wherein a portion of the first plurality of phase shifter segments uses a power-of-two length reduction relationship.

18. The digital optical modulator of claim 15, further comprising a second waveguide arm optically coupled to the first waveguide arm at the first end and the second end.

19. The digital optical modulator of claim 18, wherein the second waveguide arm is an idle arm.

20. The digital optical modulator of claim 18, further comprising a second plurality of phase shifter segments electro-optically coupled to the second waveguide arm, and wherein at least two of the second plurality of phase shifter segments are the same length.

21. The digital optical modulator of claim 15, wherein the phase shifter segments are configured to create a binary relationship of phase change.

* * * * *

UNITED STATES PATENT AND TRADEMARK OFFICE
CERTIFICATE OF CORRECTION

| | | |
|---|---|---|
| PATENT NO. | : 9,746,698 B2 | Page 1 of 1 |
| APPLICATION NO. | : 14/832840 | |
| DATED | : August 29, 2017 | |
| INVENTOR(S) | : Dominic John Goodwill | |

It is certified that error appears in the above-identified patent and that said Letters Patent is hereby corrected as shown below:

On the Title Page

Page 2, Column 1, Line 8, Foreign Patent Documents should read:

CN      102648434 A 8/2012

Signed and Sealed this
Tenth Day of October, 2017

Joseph Matal
*Performing the Functions and Duties of the*
*Under Secretary of Commerce for Intellectual Property and*
*Director of the United States Patent and Trademark Office*